Patented Oct. 29, 1940

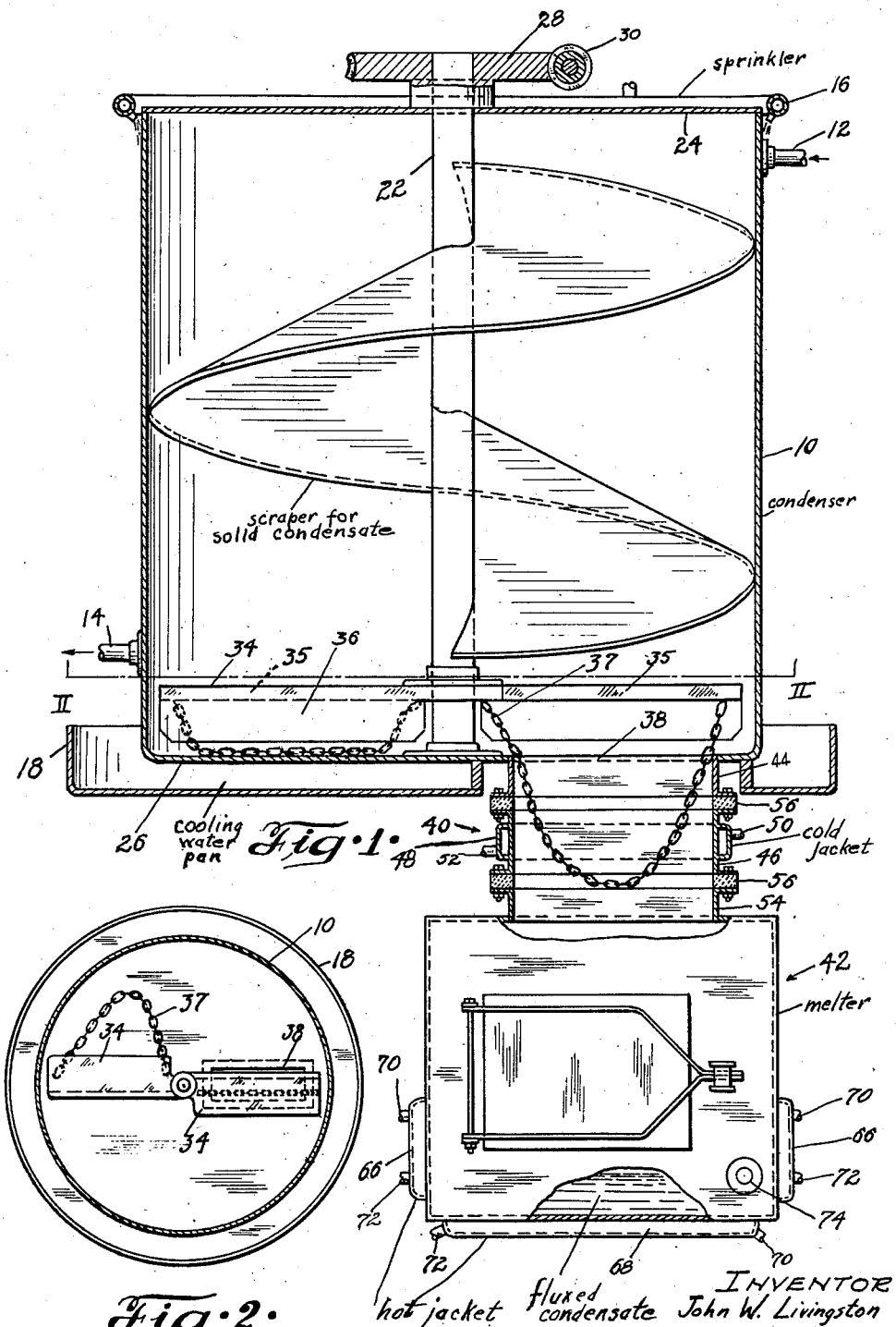

2,219,996

UNITED STATES PATENT OFFICE 2,219,996

METHOD AND APPARATUS FOR RECOVERING PHTHALIC ANHYDRIDE

John W. Livingston, Kirkwood, Mo., assignor to Monsanto Chemical Company, St. Louis, Mo., a corporation of Delaware Application August 26, 1935, Serial No. 37,921

15 Claims. (Cl. 260—343)

The present invention relates to a method and apparatus for recovering phthalic anhydride from a hot vaporous reaction mixture containing the same, characterized by the fact that it is continuous, requiring little or no manual labor, thus minimizing health hazards, inexpensive to construct and operate, self-contained and requires very little floor space as compared to known recovery systems.

This application is a continuation in part of my copending application, Serial Number 398,872, filed October 11, 1929.

Most phthalic anhydride is manufactured by the so-called air oxidation method, according to which naphthalene vapors and air are conducted, under controlled temperature conditions, over vanadium oxide, which functions as a catalyst. The reacted vapors are cooled from the reaction temperature of approximately 450–500° C. to a point where all or substantially all of the phthalic anhydride separates. Although phthalic anhydride melts at approximately 130° C., and in a crude form such as is recovered from the reacted mixture as low as 120–128 ° C., and boils at 284° C., it is necessary to cool the vapors well below the melting point, preferably as much as 40° or 50° C. or more, in order to make certain that the recovery of the anhydride is complete. This is important because of the large volume of diluent vapor and the appreciable vapor pressure of phthalic anhydride at temperatures even as low as the melting point. Under these conditions, the product recovered is solid and not liquid as one might expect or hope. In actual practice it has been found that the solid deposits upon the cool surfaces in long needles. However, where the vapors are chilled quickly, as is the case where a jet of water is sprayed against the cooling surface, the anhydride deposits as relatively dense, short needles which coat the surface of the condenser, thereby impeding the rate of heat transfer and consequently the efficiency of cooling the surface.

In my co-pending application I have disclosed a method and apparatus wherein the reacted vapors are conducted through one or more condensers each consisting of a cylindrical tank which is cooled from the outside surface by a jet or film of water. The deposit or crust of phthalic anhydride is removed continuously by means of a set of scraping blades or a helical coil whereupon it falls by gravity to the funnel-shaped lower extremity of the condenser. Immediately below the condenser is a melting tank wherein the solid anhydride drops by gravity and is melted and finally withdrawn in a molten condition. From time to time, bridging over of solid phthalic anhydride tends to interrupt the operation of the device, whereupon it becomes necessary to dislodge the solid product and force it downwardly into the melter. This is overcome by means of heating coils disposed in the restricted juncture of the melter and condenser.

The present application is directed toward an improvement in the method and apparatus disclosed in my afore-mentioned application. The improvements center about the means for controlling the temperature by maintaining the passageway between the condenser and the melter and the portions adjacent thereto at a relatively low temperature to obtain efficient and complete recovery of the anhydride product, means for assuring continuous operation and avoiding stoppage by reason of an accumulation or bridging over of anhydride at the point where the anhydride passes from the condenser to the melter, and more specifically means for assuring continued operation of the scraper and continuous delivery of the scraped product to the melter, while at the same time assuring complete removal of anhydride from the vapor.

The foregoing objects and purposes, together with others, will be more apparent from a consideration of the accompanying drawing and descriptions especially directed thereto of an embodiment of the principles of my invention which may be preferred.

Figure 1 is an elevational view, partly in cross-section, of one form which the invention may take; and Figure 2 is a cross-sectional view taken along the lines II—II of Figure 1, and on a somewhat smaller scale than Figure 1.

The present invention contemplates a continuous method of, and apparatus for, recovering normally solid materials, such as phthalic anhydride, from a dilute vaporous mixture thereof in which the anhydride vapors are condensed upon the walls of a chamber. They are scraped or dislodged from the condenser wall and deposited in a particular manner in a heated chamber which is thermally isolated, and yet which communicates directly with the first chamber. In this second chamber the solid material is melted down into fluid state.

In a preferred embodiment of the apparatus, a condenser in the form of a closed cylindrical container or tank 10 of suitable metal or other material is provided near its top with an inlet conduit 12 for vapors and gases and near the bottom thereof with an outlet conduit 14 for uncondensed materials. The container is cooled in any convenient manner, preferably by means of jets of water from spray pipes 16, which are directed at the vertical wall surfaces of the container adjacent the top thereof in order that the water may flow down the sides as a film. A pan 18 disposed under the container receives the water as it drips from the bottom of the container.

For purposes of removing the solids as they are condensed upon the inner surfaces of the container, a coaxially disposed shaft 22 is journalled in the top at 24 and the bottom at 26 of the container and is equipped upon its upper end, which projects through the container, with a drive mechanism of any convenient design. This mechanism may comprise a worm gear 28 fixed upon the shaft and a worm gear 30 in engagement therewith, the latter of which may be driven by an electrical motor (not shown). The shaft 22 carries a scraper blade or blades which may take the form of a continuous or segmented helix or spiral supported by the shaft as an axis, and terminating a short distance above the bottom 26 of the container 10. A cross-arm 34 is also secured to the shaft directly below the lower end of the scraper, and may in cross-section be of angular configuration, with a horizontal flange 35 and a vertical web 36. The lower edge of the web extends into proximity of and functions to sweep or scrape the bottom 26 of the container.

A chain 37 is attached in loops to arm 34 which drag upon the bottom 26 and function to knock the material detached by the scraper 32 into and through a rectangular eccentrically disposed radial opening 38 and throat 40 at the bottom of container 10. The throat, which is placed as far from the outlet 14 as conveniently possible, connects the container with a melter 42 and comprises a number of sections (three being shown), the upper one 44 of which is integrally formed with or otherwise suitably secured to the container. The intermediate section 46 is provided with a jacket 48 for cooling fluid which finds ingress and egress respectively through conduits 50 and 52. The lower section 54 is integrally formed with or otherwise attached to the melter 42. For purposes of further preventing the conductance of heat from the receiver through the walls of the throat to the condenser 10, relatively heavy gaskets 56 of asbestos or other insulating material are disposed between the flanged edges of the throat sections. Conventional bolts, extending through these flanges, function to compress the gaskets and thus to provide a vapor and gas tight seal.

The bottom of the melter 42 and two opposite lateral portions thereof are equipped with jackets 66 and 68 through which a heating fluid, such as hot water or steam, is caused to circulate by means of inlet and outlet conduits 70 and 72.

Molten material from the bottom of the receiver 42 flows off to a tank or other receptacle through an outlet 74 which preferably extends through the wall of the receiver at a slight distance above the bottom, in order that a pool of anhydride is maintained in which the solid is fluxed. By supplying the heat for fluxing purposes directly into the pool of anhydride, materially improved operating efficiency of the condenser is realized.

Entrance into the receiver for purposes of cleaning or repairing is obtained through a sealed door 76, hinged or otherwise mounted upon the side wall of container 42.

The mode of operation of the apparatus is self-evident from the foregoing description. Vaporous material such as a mixture of phthalic anhydride, maleic anhydride, benzoic acid and water vapors together with air, carbon dioxide and nitrogen, which results from air oxidation of naphthalene is introduced into the condenser tank 10 through the inlet conduit 12 while jets of water from the sprayer 16 are projected upon side walls thereof and flow downwardly and drip off into the waste water pan 18. Upon contact with the chilled side walls the vaporized phthalic anhydride, benzoic acid and the like are condensed as a solid, usually of crystalline nature which adheres to the walls of the condenser. These deposits are dislodged by the rotating scraper and fall upon the bottom 26 where they are swept along by the bar flange 35 and chain 37 until finally they drop through the relatively cool throat 40 into the receiver 42. The solid drops into the pool where it is fluxed and from which the molten material flows off through conduit 74 for further treatment or for storage.

From the foregoing description it will be apparent that a relatively simple embodiment of apparatus has been provided, which is capable of efficiently condensing a normally solid material from its vapor phase in a continuous manner and in a substantially completely closed system. At the same time, the product is obtained in molten condition and may be handled with minimum expenditure of labor, maximum economy of space and with practically complete elimination of disagreeable vapors within the factory.

In this apparatus there is little or no tendency for the throat 40 to clog or choke and the knocking action afforded by the dropping of the loops of the chain 37 into the throat is found to be adequate to keep it clear. The cool throat is highly advantageous from a technical point of view, because it prevents conduction of heat and convection of hot vapors from the melter into the condenser thereby impairing the efficiency of the condenser and causing loss of anhydride product.

What I claim is:

1. In an apparatus of the type described the combination of a condenser, means for dislodging solid condensate on the walls thereof, a melter receptacle disposed below the condenser and interconnected therewith by an open passageway to receive dislodged solid, means for supplying heat to the contents of the melter, and mechanical means to force the dislodged anhydride from the condenser into the melter and means for cooling the passageway to prevent thermal conduction of heat from the melter to the condenser thru the metal constituting the walls thereof.

2. In an apparatus of the type described, the combination of a mechanically scraped condenser, a melter connected therewith and thermally isolated therefrom, and mechanical means for forcing solid condensed product from the condenser to the melter while continuously maintaining the thermal isolation of the condenser and the melter with respect to each other by means of a cooled throat interconnecting the two.

3. In an apparatus of the type described, a combination of a mechanically scraped condenser and a melter connected therewith and thermally isolated therefrom, said thermal isolation being effected in part by means of a water jacketed throat, and mechanical means for forcing solid condensed product from the condenser to the melter comprising chains which promote the movement of the solid condensate from the condenser into the melter by periodically descending into said throat.

4. The combination as defined in claim 2 and further characterized in that the melter is so designed as to maintain a pool of molten condensate which is maintained at such temperature as to flux solid condensate that is delivered from the condenser, the heat to maintain the temperature being supplied to the pool below the surface thereof.

5. An apparatus of the type described, the combination of a condenser, a melter and a throat inter-connecting the two, said throat being of restricted cross-section as compared to the condenser and melter, and being cooled so as to thermally isolate the condenser and mechanical means for maintaining free passage of solid condensate from the condenser to the melter.

6. In an apparatus of the type described, the combination of a condenser and melter and a throat interconnecting the two, said throat being of restricted cross section as compared to the condenser and melter and being cooled so as to thermally isolate the condenser, and mechanical means for maintaining free passage of solid condensate from the condenser to the melter comprising chains which enter and recede from the throat periodically, said chains being of sufficient mass to dislodge any abridgement of solid condensate in the throat portion.

7. In an apparatus of the type described, a condenser having a solid condensate discharge aperture in the base thereof, and equipped with a rotating, scraping mechanism for dislodging solid condensate which deposits on a vertical wall surface thereof, mechanical means at the base of the condenser for delivering the dislodged condensate to the discharge outlet at the base of the condenser and means intermittently descending into and retracting from the aperture cooperative with the mechanical means adapted to maintain the discharge aperture unrestricted by accumulation of solid condensate.

8. An apparatus for recovering a sublimable material from vapor phase as a liquid product, comprising a cylindrical condenser chamber, a rotatable shaft axially disposed in the chamber and carrying scraper means engaging the side walls of the chamber, said chamber being provided with a bottom portion formed with an eccentrically disposed opening for the discharge of solid products, said shaft being provided with additional means for scraping the bottom of the chamber, a heated receiver disposed below the condenser and communicating therewith through said opening, said receiver functioning continuously to melt the product as it collects and means for continuously cooling the opening.

9. Apparatus for recovering a sublimable material from its vapor phase, comprising a cylindrical condenser chamber, a rotable shaft axially disposed in the chamber and carrying a scraper means, said chamber being provided with a bottom portion formed with an opening for the discharge of solid products and being eccentrically disposed with respect to the shaft, said shaft being provided with additional means for scraping the bottom of the chamber and a chain carried by the latter means and being disposed to drop into and retract from the opening in the bottom portion during the passage of the scraper over the bottom.

10. An apparatus for condensing vapors of and collecting as a liquid a material, which at its melting point exerts a substantial vapor pressure, comprising a condenser, means to cool the condenser below the temperature of solidification of the material, a receiver disposed below the condenser, said condenser and receiver being interconnected by means of a restricted throat, means for cooling the throat, while leaving the throat substantially continuously open, means for scraping the walls of the condenser and dropping the contents into the receiver and means for heating the receiver to a temperature above the melting point of the material disposed therein.

11. An apparatus for recovering phthalic anhydride suspended in vapor phase in a gaseous medium, comprising a condenser chamber, a receiver chamber, disposed below the condenser chamber means to heat the receiver chamber above the melting point of phthalic anhydride, a throat connecting the condenser chamber with the receiver chamber, and means for discharging solid material from the condenser chamber through the throat and means to prevent conduction of heat by the throat from the receiver chamber to the condenser chamber, while the throat is continuously open, said means comprising a cooling jacket.

12. In an apparatus for recovering a sublimable material from its vapor phase, means for maintaining free passage of solid condensate, from a condenser to a melter interconnected by a passageway comprising flexible elements which enter and recede from the passageway periodically, said elements being of sufficient mass to dislodge any abridgement of solid condensate in the passageway.

13. In an apparatus of the class described, a condensing chamber provided with a gas inlet and a gas outlet adapted for continuous and simultaneous operation, a melter disposed adjacent the condensing chamber and connected thereto but thermally isolated from said condensing chamber by means of a cooled passageway and mechanical means for facilitating moving of solid from the condenser to the melter.

14. In an apparatus for recovering a sublimable material from its vapor phase means for maintaining free passage of solid condensate, from a condenser to a melter interconnected by a passageway, comprising elements which enter and recede from the passageway periodically, said elements being of sufficient mass to dislodge any abridgement of solid condensate in the passageway.

15. In an apparatus of the type described, the combination of a condenser and a melter connected therewith by a passageway but thermally isolated therefrom, and mechanical means for forcing solid condensed product from the condenser to the melter comprising chains which promote the movement of the solid condensate from the condenser into the melter by intermittently descending and rising in said passageway.

JOHN W. LIVINGSTON.